United States Patent [19]
Carner

[11] 3,757,755
[45] Sept. 11, 1973

[54] ENGINE CONTROL APPARATUS

[75] Inventor: Walter J. Carner, Ft. Collins, Colo.

[73] Assignee: Institute of Gas Technology, Chicago, Ill.

[22] Filed: Oct. 14, 1971

[21] Appl. No.: 189,426

[52] U.S. Cl. ... 123/148 E, 123/146.5 A, 123/117 R, 123/32 EA
[51] Int. Cl. ............................................. F02p 1/00
[58] Field of Search ................ 123/148 E, 146.5 A, 123/117 R, 32 EA

[56] References Cited
UNITED STATES PATENTS

| | | |
|---|---|---|
| 3,314,407 | 4/1947 | Schneider ........................ 123/148 E |
| 3,418,989 | 12/1968 | Silverman ........................ 123/148 E |
| 3,454,871 | 7/1969 | Nolting ............................ 123/148 E |
| 3,521,611 | 7/1970 | Finch ............................ 123/146.5 A |
| 3,621,826 | 11/1971 | Chrestensen .................... 123/148 E |

Primary Examiner—Laurence M. Goodridge
Assistant Examiner—Cort Flint
Attorney—Molinare, Allegretti, Newitt & Witcoff

[57] ABSTRACT

The disclosure describes a system for controlling the performance and efficiency of an internal combustion engine of the type having a plurality of combustion chambers that are fitted with controlling devices, such as spark plugs, in order to drive a rotatable engine member, such as camshaft or a crankshaft. Encoder means for producing identity code signals that uniquely identify a plurality of positions of the rotatable engine member are provided in order to monitor the cyclic position and speed of the engine. Additional monitors may be provided for continuously monitoring other engine parameters, such as the load placed on the engine. These engine monitors convert the value of the engine parameters into corresponding electrical signals. The actuation of the controlling devices is controlled by a distribution electronic logic circuit that enables the controlling devices to be selected and actuated over a predetermined number of rotational degrees of the rotatable engine member. After the proper controlling device has been selected, the exact time of actuation is controlled by a variable electronic delay circuit that is controlled by the electrical signals corresponding to the engine parameters.

3 Claims, 9 Drawing Figures

INVENTOR.
WALTER J. CARNER

ENGINE CONTROL APPARATUS

BACKGROUND OF THE INVENTION FIELD OF THE INVENTION AND DESCRIPTION OF THE PRIOR ART

This invention relates to a system which controls engine performance by adjusting engine operating input factors, such as spark timing, fuel injection timing, valve timing and the like, to variable engine conditions, such as speed and load, so as to provide a reliable engine having improved efficiency and performance with reduced polluting emissions.

Internal combustion engines generally have either an ignition system of the distributor type or of the breakerless-magneto type. Both of these systems for internal combustion engines involve the use of various mechanical linkages and moving parts which time the ignition operation and sequencing of each of the cylinders in accordance with the rotary position of the engine camshaft. With these normal requirements of mechanical parts and linkages in internal combustion engines, particularly those using the magneto type of ignition system, the result usually is less than desirable engine performance including lack of reliability, efficiency, and an excessive emission of exhaust pollutants.

In the normal four stroke internal combustion engine cycle, inlet and exhaust valves open and close and spark ignition occurs every 720° of crankshaft revolution and every 360° of camshaft revolution. The camshaft is conventionally used, together with various mechanical linkages for timing the firing order and mechanically opening and closing valves of a multiple cylinder internal combustion engine. Each of the cylinders is designed to operate at a different angular rotary position of the camshaft, so that uniform power is generated by the pistons in the cylinder and is imparted to the crankshaft to drive a load. Timing of the spark valve operation, or fuel injection desirably varies in accordance with the speed and load of the engine. This, of course, has been recognized to a certain extent in the automotive field, where spark timing is mechanically varied in a predetermined manner, for example, by the exhaust manifold vacuum. Engine timing is commonly set for typical operating conditions. If these operating conditions are not present, however, the engine does not operate at optimum performance and efficiency. With mechanical timing arrangments, it is not possible to compensate for the great variety of factors affecting engine performance. Similarly with industrial stationary engine applications, it is common for the conventional magneto system to be fixed at a preselected position. However, the timing usually gives optimum performance at only one speed with a fixed load or only at one load with a fixed speed.

Engine efficiency becomes economically significant as the size of the engine increases. For example, by optimizing the spark timing of a 500 horse power stationary engine operating at full load and with a 4 percent drop in efficiency for each 10° deviation from optimum timing, annual fuel saving would be in the range of $350 to $400.

Furthermore, pollution control of internal combustion engines is becoming more important not only from a scientific standpoint, but also from a social-political point of view. One of the best ways to accomplish reduction of the amount of pollutants exhausted from an internal combustion engine is through achievement of maximum efficiency in the combustion chamber. This is accomplished not only by improved fuels, such as by use of liquefied natural gas and compressed natural gas, which have less exhaust pollutants than more conventional internal combustion engine fuels, but it is also accomplished by improved carburetion or fuel injection and by optimizing ignition and valve timing.

SUMMARY OF THE INVENTION

It is therefore an important object of this invention to provide an improved system for controlling engine performance, efficiency and reliability wherein electrical and electronic circuitry is provided for achiving such optimum conditions.

It is also an object of this invention to provide an improved electronic control system for internal combustion engines wherein means are provided for monitoring the engine output characteristics and encoders maintain accurate monitoring of the rotary position of the camshaft or crankshaft at any given moment, and wherein the ignition timing of each of the cylinders is computed and adjusted in accordance with the engine load and speed to attain optimum performance, reliability and efficiency through electronic logic circuitry.

It is a further object of this invention to provide an electronic logic system which instantaneously and accurately monitors engine performance and camshaft or crankshaft position and which controls cylinder operation through valve, ignition or fuel injection timing so as to provide for optimum efficiency in engine performance.

It is yet another object of this invention to provide a unique electronic control logic circuit for receiving electrical signals from engine performance monitors and from camshaft or crankshaft rotary position encoders and for electronically computing the timing and sequencing of operation of each cylinder of a multiple cylinder internal combustion engine to attain optimum engine performance.

It is yet another object of this invention to provide an improved system for accurately controlling the spark ignition of an internal combustion engine so as to produce improved engine performance and efficiency wherein the system is particularly characterized by its economy of construction and operation.

The foregoing objects are accomplished by providing an electronic system for controlling an engine having at least a first controlling device, such as a spark plug or valve, adapted to be actuated when a rotatable engine member, such as a crankshaft is driven by the engine to a first adjustable angular position and having at least a second controllling device, such as another spark plug or valve, adapted to be actuated when the rotatable engine member is driven to a second adjustable angular positon. According to an important feature of the invention, the electronic system comprises encoder means for generating identity code signals that identify a plurality of positions of the rotatable engine member. First and second control means are also provided for generating control signals having values proportional to various engine parameters. The controlling devices are actuated by first and second electronic actuating means in response to first and second trigger signals respectively. First and second actuating electronic logic means are also provided for generating the first and second trigger signals in response to an actuating signal and first and second distribution signals, respectively. The first and second electronic logic means are controlled by distribution electronic logic means. The distribution electronic logic means generate the first distribution signal prior to the time the rotatable engine member reaches the first adjustable angular position and the distribution electronic logic means generate the second distribution signal prior to the time the rotatable engine member reaches the second adjustable angular position. Thus, the distribution electronic logic means select the spark plug or valve to be actuated, and holds the first or second actuating electronic logic means in a state of readiness while the precise actuating time is electronically calculated by variable electronic delay means. This variable electronic delay means generates an actuating signal that activates the proper controlling device after the production of each distribution signal within a predetermined angular rotation of the rotatable engine member that is controlled by the values of the engine parameters through the first and second control signals. For example, where spark plugs are controlled, the precise firing time of the actuating signal is varied by the variable electronic delay means depending on the state of the engine parameters, so that the spark plug is fired at precisely the right point in time to maximize efficiency and to reduce polluting engine emission to a minimum.

The advantages of such a system are at once apparent. By providing a distribution electronic logic means that holds the proper spark plug in readiness, there is no need to provide a conventional rotating distributor that is subject to mechanical wear and vibration which limits its performance capabilities. In addition, by providing a variable electronic delay means, the precise actuating time of the controlling device may be calculated with a degree of accuracy heretofore unattainable by conventional prior art apparatus.

DESCRIPTION OF THE DRAWINGS

These and other objects, advantages and features of the present invention will hereinafter appear for purposes of illustration, but not of limitation, in connection with the accompanying drawings wherein like numbers refer to like parts throughout, and wherein.

DESCRIPTION OF THE PREFERRED EMBODIMENT

Figure 1:
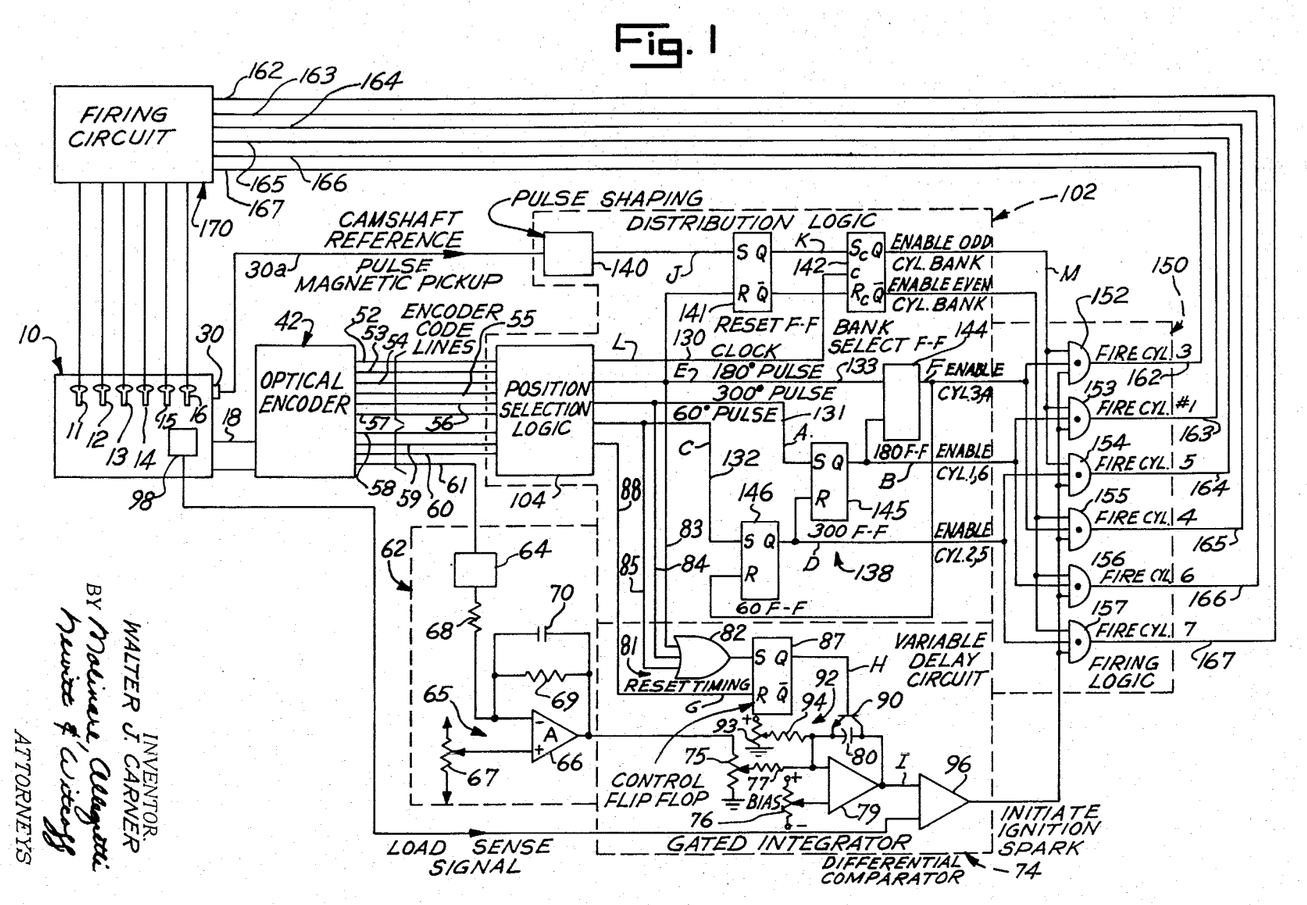
FIG. 1 is an electrical schematic drawing of a preferred embodiment of the present invention shown in connection with a conventional internal combustion engine controlled thereby.
Figures 2, 3, 4, 5:
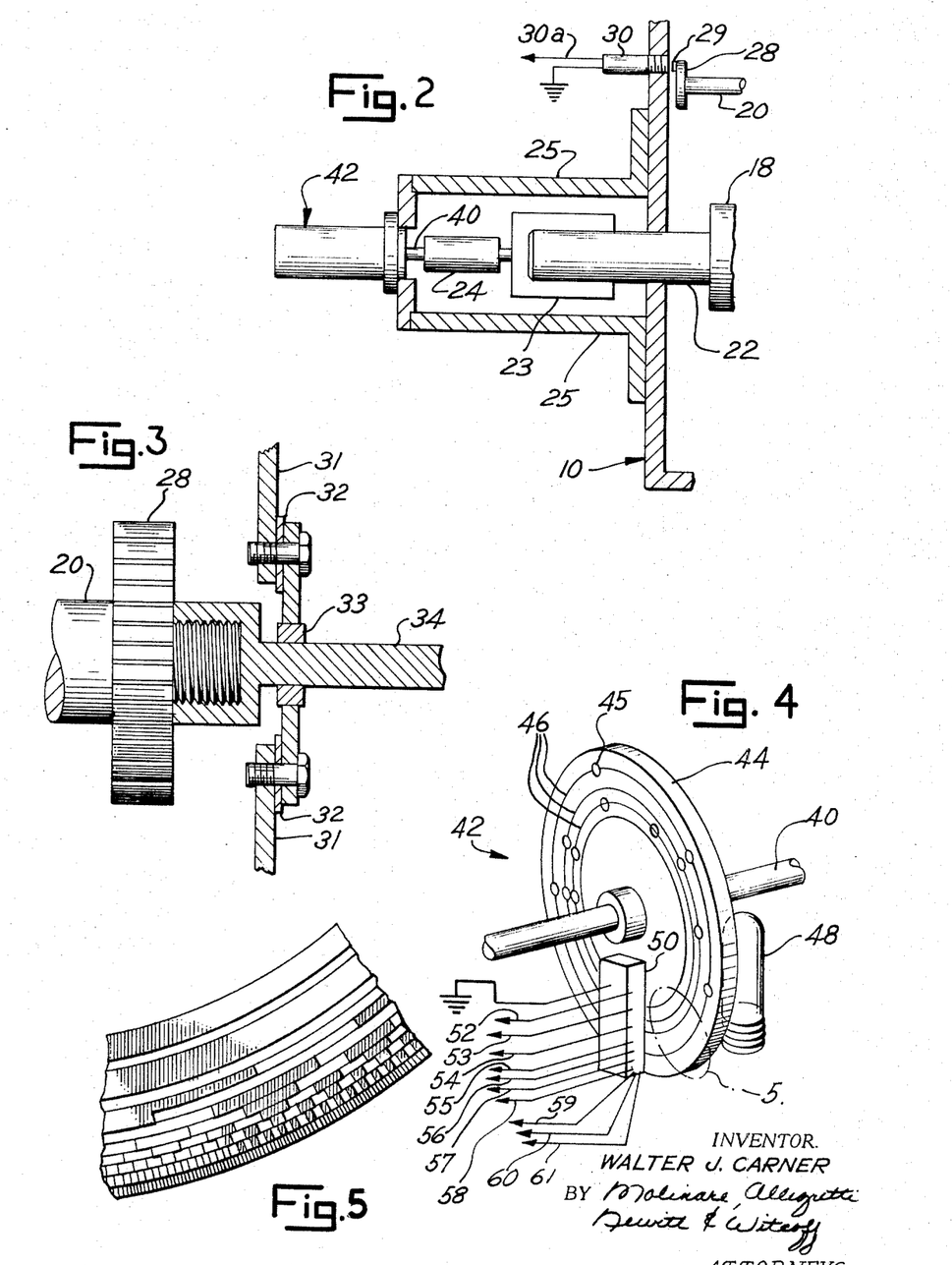
FIG. 2 is a schematic, fragmentary, side elevational view of apparatus used to couple an optical encoder to the crankshaft of the engine shown in FIG. 1.
FIG. 3 is a schematic, fragmentary, side elevational view of an alternative means of connecting the optical encoder to the camshaft of the engine shown in FIG. 1.
FIG. 4 is a perspective, partially schematic, fragmentary view of a preferred form of optical encoder used in connection with the present invention.
FIG. 5 is an enlarged, fragmentary, plan view of a preferred form of disc used in connection with the optical encoder shown in FIG. 4.

Referring to FIG. 1, the preferred embodiment of the present invention may be used in order to control a conventional internal combustion engine 10, such as a six cylinder, 1,200 rpm, Climax K-67 natural-gas-fueled engine. The six cylinders of the engine are operated by corresponding controlling devices, such as spark plugs 11–16. The spark plugs ignite the gas in the cylinders in order to drive pistons which rotate a crankshaft 18 and a camshaft 20 (FIG. 2). As is well known to those skilled in the art, the crankshaft rotates through 720 angular degrees in order to complete an ignition cycle, whereas the camshaft rotates through only 360 angular degrees to complete an ignition cycle.

As shown in FIG. 2, an optical encoder 42 may be coupled to the crankshaft by a crankshaft stub 22. A shaft coupling 22 is fitted over the crankshaft stub and is connected through a bellows coupling 24 to a shaft 40 of optical encoder 42. The crankshaft stub, shaft coupling, and bellows coupling are each held within a suitable housing 25. If the optical encoder is connected to the crankshaft, a timing gear 28 connected to the camshaft must be fitted with a steel proximity stud 29 that induces an electrical signal in a magnetic pick-up 30. As the steel proximity stud rotates adjacent the magnetic pick-up, an electrical camshaft reference pulse is induced in the magnetic pick-up and is conducted over a conductor 30a.

As shown in FIG. 3, the optical encoder may alternatively be connected through the engine housing 31, gaskets 32, and a seal 33 to a screw-on shaft extension 34 that replaces the timing gear retaining nut of camshaft 20. If this method of mounting the optical encoder is used, there is no need to generate a camshaft reference pulse.

Although the encoder is easier to mount on the crankshaft in terms of engine accessibility, the crankshaft is subject to more severe tortional vibrations than is the camshaft. As a result, improved performance may be obtained by mounting the encoder on the camshaft.

Referring to FIGS. 1 and 4–9, a preferred form of electronic engine control apparatus in accordance with the invention for use in connection with the foregoing engine and coupling apparatus basically comprises an encoder 42, a speed control circuit 62, a variable delay circuit 74, a load control apparatus 98, an electronic distribution logic circuit 102, an actuating logic circuit 150, and an actuating circuit 170 for firing spark plugs.

Referring to FIGS. 4 and 5, encoder 42 basically comprises a disc 44 that is mounted to rotate with shaft 40. This disc comprises a transparent, light transmitting pattern 45 that is arranged in multiple channels 46 that are radially displaced. A lamp 48 is illuminated by a power source (not shown) so that light is transmitted through the pattern to a phototransistor array 50 that generates identity code signals which uniquely identify each combination of light patterns transmitted through the disc. A photocell is arranged behind each channel of the disc. As a result, each discrete position of the disc is represented as a unique combination of patterns of light and dark in a number of distinct channels, each channel having a corresponding phototransistor. Thus, each channel produces an electrical output signal, and the combination of the output signals represents a unique identity code corresponding to the disc pattern and the position of shaft 40. The identity code signals produced by the encoder are transmitted over conductors 52-61. Because of the physically fixed pattern, the reference position represented by the disc is absolutely maintained. Experience has shown that the above-described absolute-type encoder is superior to other types of encoders for the purposes described herein, because it offers fewer problems in synchronizing reference positions and is not subject to miscounting caused by signal noise.

Of course, the accuracy with which the identity code signals specify the angular position of the disc depends on the number of disc channels utilized. In the present embodiment, ten code channels of the disc are utilized. The six most significant channel bits transmitted over conductors 52-57 are coded in excess (XS) 14 cyclic BCD, whereas the remaining four channel bits transmitted over conductors 58-61 are coded in XS 3 cyclic BCD. This code is advantageous over a straight binary code in which a maximum resolution of 42.2 minutes can be achieved. An encoder of the foregoing type which may be used in connection with the preferred embodiment is Model 84A manufactured by Baldwin Electronics. The optical encoder is also used to produce speed pulses, the frequency of which are proportional to the speed of the engine. These pulses are transmitted over conductor 61.

Speed control circuit 62 comprises a monostable multivibrator 64 that converts each of the variable duration speed pulses transmitted over conductor 61 to fixed duration pulses in a well-known manner. The pulses transmitted from multivibrator 64 are converted to a corresponding D.C. signal by a low-pass filter 65. Filter 65 comprises an amplifier 66 that is controlled by resistors 67, 68 and by a feed back loop comprising a resistor 69 and a capacitor 70. The amplifier produces a speed control signal that is transmitted to the variable delay circuit 74. It will be appreciated that the D.C. signal produced by filter 65 has a magnitude proportional to the speed of crankshaft 18.

Still referring to FIG. 1, variable delay circuit 74 comprises a Miller-type integrator comprising resistors 75-77, an amplifier 79, and a feed back capacitor 80 connected as shown. The variable delay circuit also comprises a resetting circuit 81 that includes an OR gate 82 which receives input signals over conductors 83-85. The resetting circuit also comprises a control flip-flop 87 that is reset by a signal transmitted over conductor 88. The Q output of flip-flop 87 controls a transistor 90 that enables the Miller integrator to produce a ramp signal having a slope that is constant with respect to the angular position of crankshaft 18 and camshaft 20. As will be described in more detail later, OR gate 82 and flip-flop 87 initiate the production of the ramp signal at a predetermined time during the operating cycle by switching transistor 90 to its nonconducting state.

The variable delay circuit also comprises an advance circuit 92 comprising a potentiometer 93 and a resistor 94. The potentiometer is connected to a source of D.C. voltage so that the magnitude of the D.C. control signal may be altered by adjusting the potentiometer. In this manner, the slope of the ramp signal produced by the Miller integrator may be adjusted in order to automatically advance the ignition timing of spark plugs 11-16. Of course, during this mode of operation, the ramp signal does not have a slope constant with respect to the angular position of crankshaft 18.

The variable delay circuit also comprises a conventional differential comparator 96 that receives the ramp signal produced by the Miller integrator at one input and receives a D.C. signal corresponding to the load placed on engine 10 from load control apparatus 98 at another input. The load control apparatus may comprise a diaphragm connected to the intake manifold of the engine which operates a potentiometer in order to generate a D.C. signal proportional to the pressure in the intake manifold. Those skilled in the art will also appreciate that the electrical load on the engine may be measured in order to derive the load control signal. When the magnitude of the load control signal and the ramp signal are identical, the differential comparator produces an actuating signal that causes a predetermined spark plug to be fired in the manner to be described hereafter.

The electronic distribution logic circuit 102 basically comprises a position selection logic circuit 104 and a gate enabling logic circuit 138.

Figure 6:
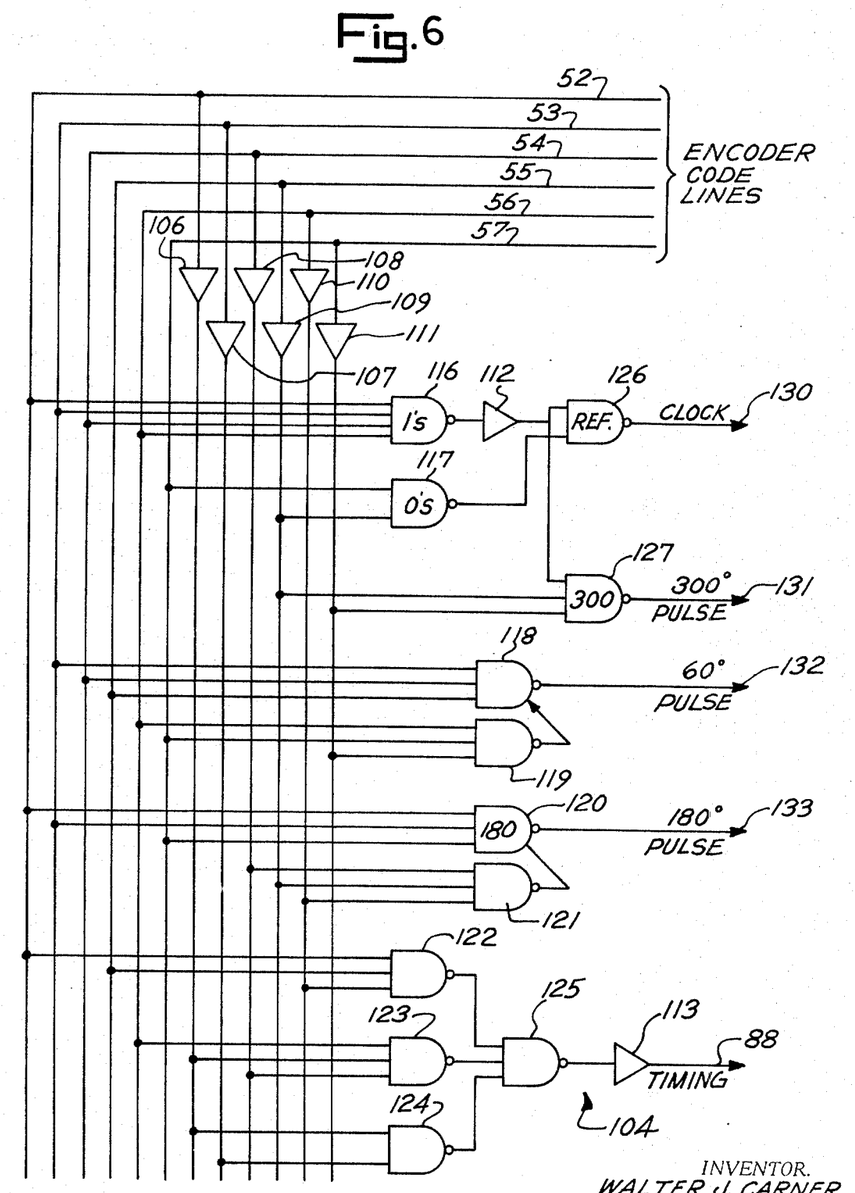
FIG. 6 is an electrical schematic drawing of a preferred position selection logic circuit shown in FIG. 1.

Referring to FIG. 6, the position selection logic circuit 104 comprises interconnected logic gates and memory necessary to decode and hold shaft position data from the encoder for operation upon the rest of the system. The interconnected gates form a read-only memory, with a prewired program that recognizes the coincidence of code patterns as a certain shaft position. As a result, the prewired program is readily adaptable for detection of any unique position (or ranges of positions) and for operation with any desired resolution. These factors illustrate another advantage of using an absolute encoder of the type described herein. That is, the timing of any function at any point or range in the cycle with any degree of resolution required can be achieved and decoded by a simple prewired program. Moreover, timing intervals for smaller segments of arc may be obtained directly from the logic gates operating on the encoder output, while larger timing intervals or segments are more readily obtained by storage in set-reset R-S flip-flops.

As shown in FIG. 6, circuit 104 comprises inverting amplifiers 106-113 and NAND gates 116-127 that produce position selection pulses over conductors 130-133.

Referring to FIG. 1, enabling logic circuit 138 utilizes R-S flip-flops that are set at some predetermined point in the ignition cycle and reset at some later point in the cycle to enable the proper spark plug to be fired. As a result of this unique circuit arrangement, the applicant has been able to achieve a 1 : 1 selection of cylinders for distribution of spark plug firing electronically, replacing mechanical linkages and/or switches. Another advantage of this arrangement is that it permits the use of a single variable delay circuit to adjust the spark plug timing to compensate for variations in engine operating conditions. That is, only a single variable delay circuit is required for each separate function whose timing overlaps that of another.

More specifically, referring to FIG. 1, circuit 138 comprises a pulse-shaping amplifier 140 that receives the camshaft reference pulse over conductor 30a. The camshaft reference pulse sets R-S flip-flop 141 and R-S bank selector flip-flop 142 so that the proper bank of cylinders is enabled. In addition, circuit 138 comprises enabling R-S flip-flop circuits 144–146 that remain switched throughout predetermined degrees of rotation of the crankshaft in response to the position selection pulses produced by circuit 104.

Still referring to FIG. 1, actuating logic circuit 150 comprises AND gates 152–157 that are connected as shown. In response to the distribution pulses produced by flip-flops 142 and 144–146, and in response to a simultaneous actuating signal from comparator 96, the AND gates produce trigger signals on conductors 162–167.

Figures 7, 8:
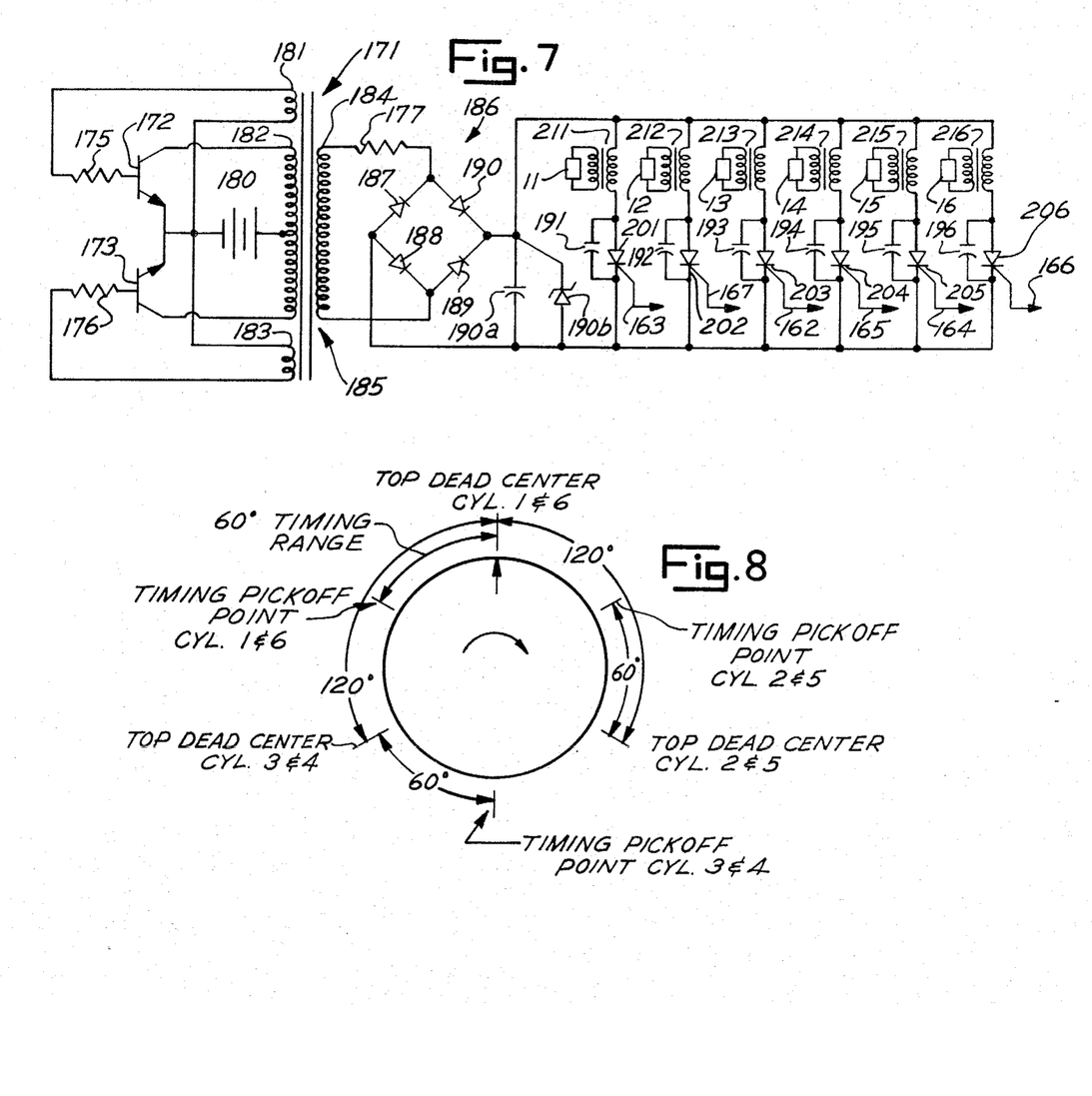
FIG. 7 is an electrical schematic drawing of a preferred form of capacitive discharging firing circuit shown in FIG. 1.
FIG. 8 is a schematic view of the crankshaft of the engine shown in FIG. 1 that has been marked to indicate the positions at which various timing signals are generated.
Figure 9:
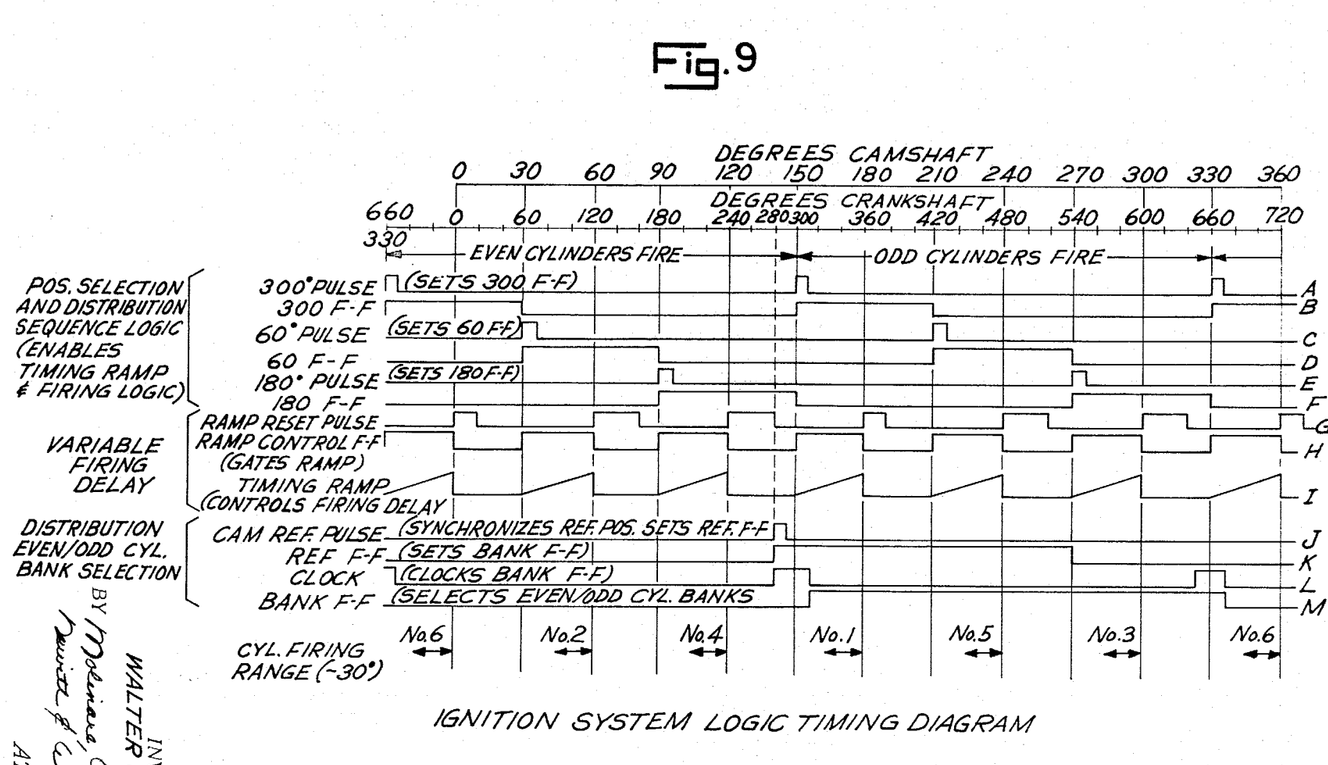
FIG. 9 is a diagram showing the waveform of the signals produced at various portions of the circuit shown in FIG. 1.

Referring to FIG. 7, actuating circuit 170 comprises a D.C. converter 171 having transistors 172, 173 and resistors 175–176. The D.C. converter also comprises a D.C. power source 180, primary coils 181–183 and a secondary coil 184 of a transformer 185. Secondary coil 184 is connected to a full wave rectifier 186 comprising diodes 187–190. The D.C. converter further comprises a filtering network comprising a capacitor 190a and a diode 190b. Spark plugs 11–16 are fired by the apparatus shown in FIG. 7 comprising capacitors 191 – 196, silicon controlled rectifiers 201–206, and high voltage transformers 211–216, respectively. By providing circuits of the type described herein, the various gates, flip-flops, and amplifiers may be fabricated from solid state, semi-conductor, integrated circuitry, thereby significantly reducing the cost of the overall system.

The operations of the apparatus will now be described assuming that the encoder is connected to crankshaft 18 which necessitates the addition of a camshaft reference pulse from magnetic pick-up 30 mounted adjacent the camshaft. The reference pulse is necessary because only one-half of the total number of cylinders is fired during one revolution of the camshaft. The resulting ambiguity necessitates the use of the reference pulse pick-up to initialize the cycle reference position.

As shown in FIG. 8, the position selection logic circuit 104 is designed to recognize the identity code signals corresponding to pick-off points spaced 120° apart on the crankshaft and 60° before the top-dead-center position of cylinders 1 and 6, 2 and 5, and 4 and 3. (In the typical four-stroke-cycle engine, two pairs of pistons are always at the same position in their strokes, but on alternate compression and exhaust cycles). Passing one of the 120° pick-off points causes the logic circuitry to initiate the timing sequence, which can vary the spark timing throughout a 60° interval. At the same time, the logic selects the pair of cylinders in which pistons are approaching the top-dead-center position, and, in conjunction with the reference signal, selects the cylinder which is ready to be fired, due to the operation of flip-flops 142 and 144–146. The reference pulse, from the camshaft pick-up, occurs within a 30° interval about the timing pick-off point for cylinders 1 and 4, and on that cycle for which the number one piston is on its compression stroke. Therefore, the reference pulse occurs every other revolution of the crankshaft, thereby allowing the logic to distinguish which cylinder of each pair is to be fired. As a result of the foregoing operation, distribution signals are sent to one of AND gates 152–157, thereby preparing the proper spark plug for firing.

At the same time, the distribution signals are produced, OR gate 82 and flip-flop 87 initiate the production of the ramp signal by the Miller integrator. As previously explained, the comparator produces an actuating signal after the production of the distribution signals within a time period determined by the magnitude of the load control signal and by the magnitude and slope of the ramp signal. As soon as the actuating signal is produced, the previously enabled AND gate produces a trigger pulse that fires the spark plug through actuating circuit 170.

As soon as another pick-off point is passed, another one of AND gates 152–157 is enabled and another actuating signal is produced to fire the next spark plug in the ignition cycle.

As previously explained, resistors 75 and 76 are adjusted so that ramp signal I normally has a slop that is constant with respect to the angular position of crankshaft 18. In this mode of operation, there is no spark "advance" introduced into the system. However, any degree of spark "advance" may be introduced by merely adjusting potentiometer 93. By means of potentiometer 93, the magnitude of the speed control signal may be changed so that the slope of the ramp signal I is altered accordingly. If the slope of the ramp signal is increased, for example, the spark is "advanced" by a proportionate amount. The operation of the apparatus may be more fully understood with reference to FIG. 9 wherein the signals corresponding to wave forms A-M are produced at the correspondingly-lettered conductors of the apparatus shown in FIG. 1.

Those skilled in the art will recognize that the preferred embodiment described herein may be altered and modified without departing from the true spirit and scope of the invention as defined in the appended claims. For example, the circuitry described herein may be used to actuate controlling such as fuel injectors or valves, as well as spark plugs.

What is claimed is:

1. An electronic control system for an engine having at least a first controlling device adapted to be actuated when a rotatable engine member is driven by the engine to an adjustable first angular position and a second controlling device adapted to be actuated when the rotatable engine member is driven to an adjustable second angular position, improved apparatus for controlling the actuation of the controlling device comprising:

encoder means for generating identity code signals that identify a plurality of positions of the rotatable engine member;

first control means for generating a speed control signal having a value proportional to engine speed;

second control means for generating a load control signal having a value proportional to engine load;

first electronic actuating means for actuating the first controlling device in response to a first trigger signal;

second electronic actuating means for actuating the second controlling device in response to a second trigger signal;

first actuating electronic logic means for generating a first trigger signal in response to an actuating signal and a first distribution signal;

second actuating electronic logic means for generating a second trigger signal in response to an actuating signal and a second distribution signal;

distribution electronic logic means for generating in response to the identity code signals a first distribution signal when the rotatable engine member is driven to a third angular position that is located a predetermined number of degrees in advance of said first angular position and for generating a second distribution signal when the rotatable engine member is driven to a fourth angular position that is located a predetermined number of degrees in advance of said second angular position;

an integrating circuit for producing a linear ramp signal;

variable impedance means connected across the integrating circuit, said varable impedance means having a high impedance state and a low impedance state;

means for producing a first start signal in response to the first distribution signal and for producing a second start signal in response to the second distribution signal;

means for transmitting the first and second start signals to the variable impedance means;

means for biasing the variable impedance means, so that the variable impedance means is switched to the high impedance state in response to the first and second start signals whereby the integrating circuit is enabled to produce the ramp signal;

means for transmitting the speed signal to the integrating circuit, the integrating circuit being constructed so that an increase in engine speed increases the slope of the linear ramp signal when the integrating circuit is enabled;

comparator means having a first input terminal, a second input terminal and an output terminal;

means for transmitting the ramp signal to the first input terminal of the comparator means; and means for transmitting the load signal to the second input terminal of the comparator means, whereby the comparator means produces an actuating signal when the ramp signal and the load signal are equal in value and whereby the first and second controlling devices are actuated when the rotatable engine member is located in the first and second angular positions respectively.

2. Apparatus, as claimed in claim 1, wherein the integrating circuit comprises a Miller integrator.

3. Apparatus, as claimed in claim 1, and further comprising means for altering the magnitude of the first control signal whereby the timing of the actuation of the first and second controlling devices is automatically advanced as the speed of the engine is advanced.

* * * * *